United States Patent
Tsuchiya et al.

(10) Patent No.: US 7,106,005 B2
(45) Date of Patent: Sep. 12, 2006

(54) VEHICLE ROOM LAMP CONTROL DEVICE AND VEHICLE ROOM LAMP CONTROL METHOD

(75) Inventors: Risaburo Tsuchiya, Atsugi (JP); Yoshihiro Mitsumoto, Yokohama (JP); Yoshiki Onuma, Ebina (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 97 days.

(21) Appl. No.: 10/984,875

(22) Filed: Nov. 10, 2004

(65) Prior Publication Data

US 2005/0105298 A1   May 19, 2005

(30) Foreign Application Priority Data

Nov. 18, 2003 (JP) ............................ P2003-387582
Mar. 26, 2004 (JP) ............................ P2004-091747

(51) Int. Cl.
    *B60Q 1/14* (2006.01)
(52) U.S. Cl. ................. 315/77; 362/464; 340/457.1; 340/458
(58) Field of Classification Search ............ 340/457.1, 340/686.1, 687, 438, 439, 521, 458, 430, 340/425.5, 426.3, 426.8; 307/10.1, 10.2; 315/77

See application file for complete search history.

(56) References Cited

U.S. PATENT DOCUMENTS

| 5,604,407 A | 2/1997 | Andres et al. |
| 2002/0055410 A1 | 5/2002 | Nagasaka |

FOREIGN PATENT DOCUMENTS

| DE | 41 34 558 A1 | 4/1993 |
| DE | 197 25 397 A1 | 1/1999 |
| DE | 100 64 099 A1 | 7/2001 |
| JP | 04-56640 | 2/1992 |

OTHER PUBLICATIONS

"March.Manual for New Type Model. Introduction of Type-K12 Car" Heisei 14-2, Nissan Motor Co., Ltd. F-48-F-51.

*Primary Examiner*—Jeffery Hofsass
*Assistant Examiner*—Hongmin Fan
(74) *Attorney, Agent, or Firm*—McDermott Will & Emery LLP

(57) ABSTRACT

When both a key insertion detecting switch (a push switch in an intelligent key system vehicle) and a buckle switch are off, a room lamp is controlled so as to be extinguished. Even when the key insertion detecting switch is off and the buckle switch is on, the room lamp is controlled so as to be extinguished. When the key insertion detecting switch is off and the buckle switch changes from on to off, the room lamp is lit, and a timer incorporated within a CPU starts counting. When a predetermined time period has elapsed, the room lamp is automatically extinguished.

19 Claims, 7 Drawing Sheets

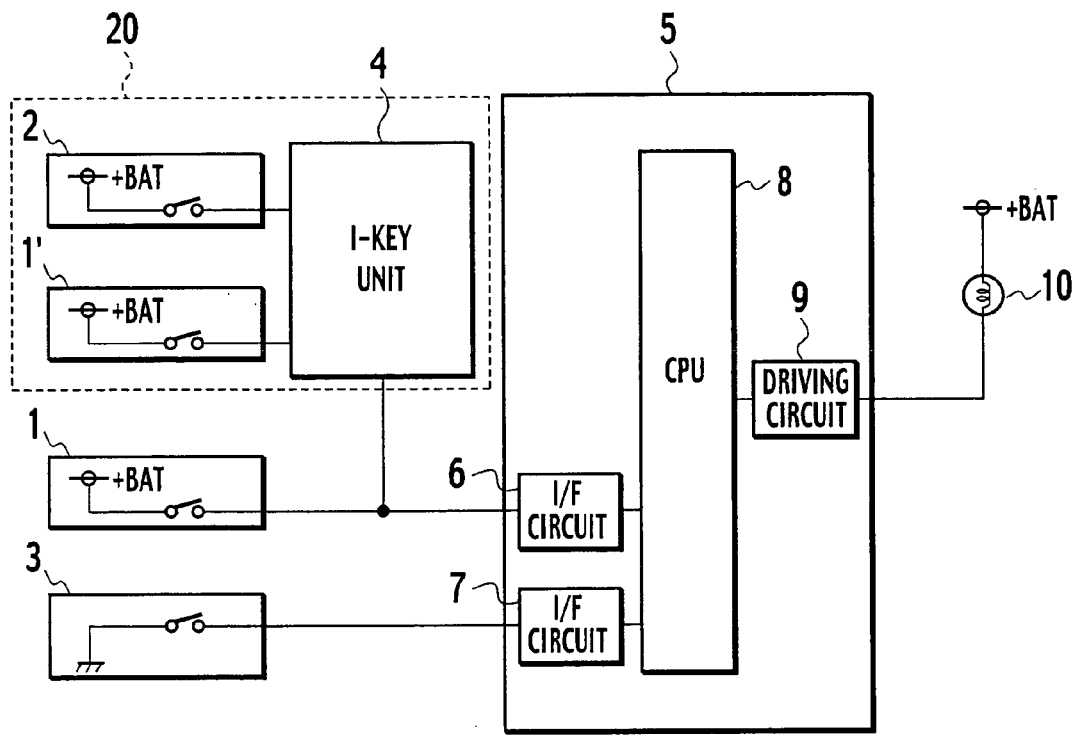

VEHICLE ROOM LAMP CONTROL DEVICE AND VEHICLE ROOM LAMP CONTROL METHOD

BACKGROUND OF THE INVENTION

The present invention relates to a vehicle room lamp control device and a vehicle room lamp control method which control the lighting and extinguishing of an illuminating unit such as a room lamp provided at the center of the ceiling at the vehicle interior, or a spot lamp, a console lamp, a personal lamp, or the like.

Vehicle room lamp control devices, which light a room lamp when a key insertion switch or a push switch changes from an on state to an off state, are conventionally known.

SUMMARY OF THE INVENTION

However, in accordance with the structure of such conventional vehicle room lamp control devices, when a driver parks a vehicle and stops an engine in order to take a rest or the like, even in cases in which the driver is merely stopping the engine and has no intention of exiting the vehicle, the room lamp is lit, and the driver may feel annoyed.

The present invention has been achieved in order to overcome the above-described drawback, and an object of the present invention is to provide a vehicle room lamp control device and a vehicle room lamp control method which can prevent an illuminating unit from lighting although the vehicle occupant has no intent to exit the vehicle, and thereby prevent the vehicle occupant from feeling annoyed.

In order to achieve the aforementioned object, according to a first aspect of the present invention an illuminating unit is lit when a seatbelt-buckling detecting unit detects that a seatbelt is released, in a state in which a non-operable state of a vehicle is detected by a non-operable state detecting unit. According to a second aspect of the present invention, a stopped state of an engine and presence/absence of buckling of a seatbelt are detected and an illuminating unit is lit when, while the engine is running, an engine start/stop switch is pushed and operated and the stopped state of the engine is detected and a state of non-buckling of the seatbelt by the vehicle occupant is detected.

BRIEF DESCRIPTION OF THE DRAWINGS

FIG. 1 is a block diagram showing the structure of a vehicle room lamp control device according to a first embodiment of the present invention;

FIG. 2 shows a control table of the vehicle room lamp control device shown in FIG. 1;

DESCRIPTION OF THE PREFERRED EMBODIMENTS

Figure 3:
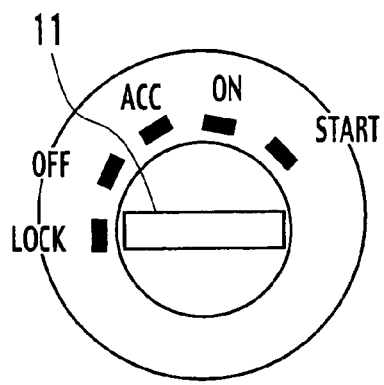
FIG. 3 is a schematic diagram showing an example of the structure of an ignition knob.

Preferred embodiments of the present invention will be described below with reference to the accompanying drawings. In the drawings explained below, components with like functions are designated by like reference numerals and explanations thereof will not be repeated.

FIRST EMBODIMENT

The structure and operation of a vehicle room lamp control device according to a first embodiment of the invention will be described with reference to FIGS. 1 to 3.

FIG. 1 is a diagram showing the structure of the vehicle room lamp control device. In a vehicle which is not equipped with an intelligent key system, there is no key structure 20 for an intelligent key system vehicle, and a key insertion detecting switch (non-operable state detecting unit) (SW) 1 is turned on when a key is inserted into the ignition key cylinder, and is turned off when the key is pulled-out. The vehicle is in a non-operable state when the key is in a state of being pulled-out.

In the case of an intelligent key system vehicle, there is no key insertion detecting switch 1, but there is the key structure 20 for an intelligent key system vehicle, which is formed from a reserve key insertion detecting switch 1' and one more push switch (non-operable state detecting unit) 2. When an ignition knob 11 is pushed at the LOCK position as shown in FIG. 3, the push switch 2 is turned on, and when the ignition knob 11 is let go of at this LOCK position, the push switch 2 is automatically turned off. When the ignition knob 11 is let go of at the LOCK position, the vehicle is in a non-operable state.

When the push switch 2 or the key insertion detecting switch 1' is turned on, a control unit (I-KEY unit) 4 of an intelligent key system vehicle outputs on information under the OR condition of the on, and outputs off information under the AND condition of the off.

A buckle switch 3 (seatbelt-buckling detecting unit) is turned on when a seatbelt is inserted into a buckle, and is turned off when the seatbelt is released from the buckle.

A vehicle room lamp control device 5 fetches on/off information of the key insertion detecting switch 1 (in an intelligent key system vehicle, on information under the OR condition when the push switch 2 or the key insertion detecting switch 1' is on, and off information under the AND condition of the off) into a CPU (control unit) 8 via an interface (I/F) circuit 6, and fetches the on/off information of the buckle switch 3 into the CPU 8 via an interface circuit 7. On the basis of the on/off information fetched from the interface circuits 7, 8, the CPU 8 controls the lighting and extinguishing of a room lamp (illuminating unit) 10 through a driving circuit 9.

Next, operation of the vehicle room lamp control device 5 will be described on the basis of a control table of the vehicle room lamp control device shown in FIG. 2.

When both the key insertion detecting switch 1 (the push switch 2 in an intelligent key system vehicle) and the buckle switch 3 are off (state A in Table 1), the room lamp 10 is controlled so as to be in an extinguished state (OFF). Also when the key insertion detecting switch 1 is off and the buckle switch 3 is on (state B in FIG. 2), the room lamp 10 is controlled so as to be in an extinguished state. When the key insertion detecting switch 1 is off and the buckle switch 3 changes from on to off (state C in FIG. 2), the room lamp 10 is lit (ON), and a timer incorporated in the CPU 8 begins counting. When a predetermined time period has expired, the room lamp 10 is automatically extinguished.

In the case of an intelligent key system vehicle, when, for example, from a state in which the engine is operated while the vehicle is running, the ignition knob 11 shown in FIG. 3 is returned to the LOCK position and is let go of in order to cut the engine, the push switch 2 automatically changes from on to off, and the room lamp 10 remains extinguished. Thereafter, when the vehicle occupant releases the seatbelt in order to exit the vehicle, the buckle switch 3 changes from on to off (state C in FIG. 2), the room lamp 10 is lit, and the timer starts counting (this lit mode is called timed-lighting).

As described above, according to a first embodiment of the present invention, in an intelligent key system vehicle, even when the ignition knob 11 is returned to the LOCK position in order to stop the engine, the room lamp is not timed-lit. And, when the seatbelt is released after the ignition knob 11 is returned to the LOCK position, it is determined that the driver intends to exit the vehicle, and the room lamp is first timed-lit. Therefore, it is possible to prevent the illuminating unit from lighting even though the vehicle occupant has no intent to exit the vehicle, and prevent the vehicle occupant from feeling annoyed.

Regardless of the presence/absence of an intelligent key system, the room lamp can be timed-lit under the same conditions, and it is possible to prevent the timed-lighting conditions from differing in accordance with the type of vehicle.

SECOND EMBODIMENT

The structure and operation of a vehicle room lamp control device according to a second embodiment of the invention will be described with reference to FIG. 4, which illustrates the structure of the vehicle room lamp control device, and the flowchart of FIG. 5 which illustrates the operation thereof.

Figure 4:
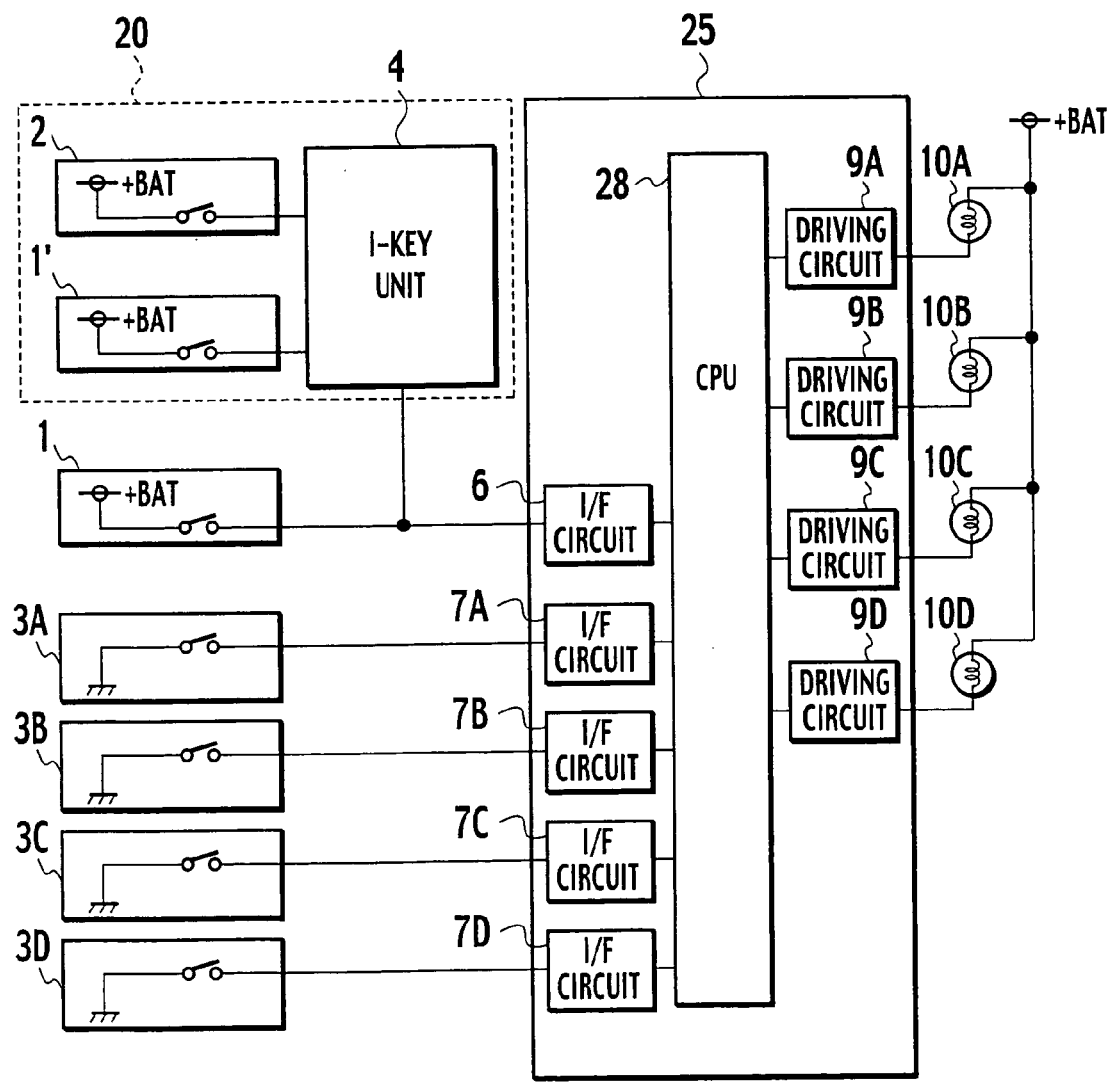
FIG. 4 is a block diagram showing the structure of a vehicle room lamp control device according to a second embodiment of the present invention.
Figure 5:
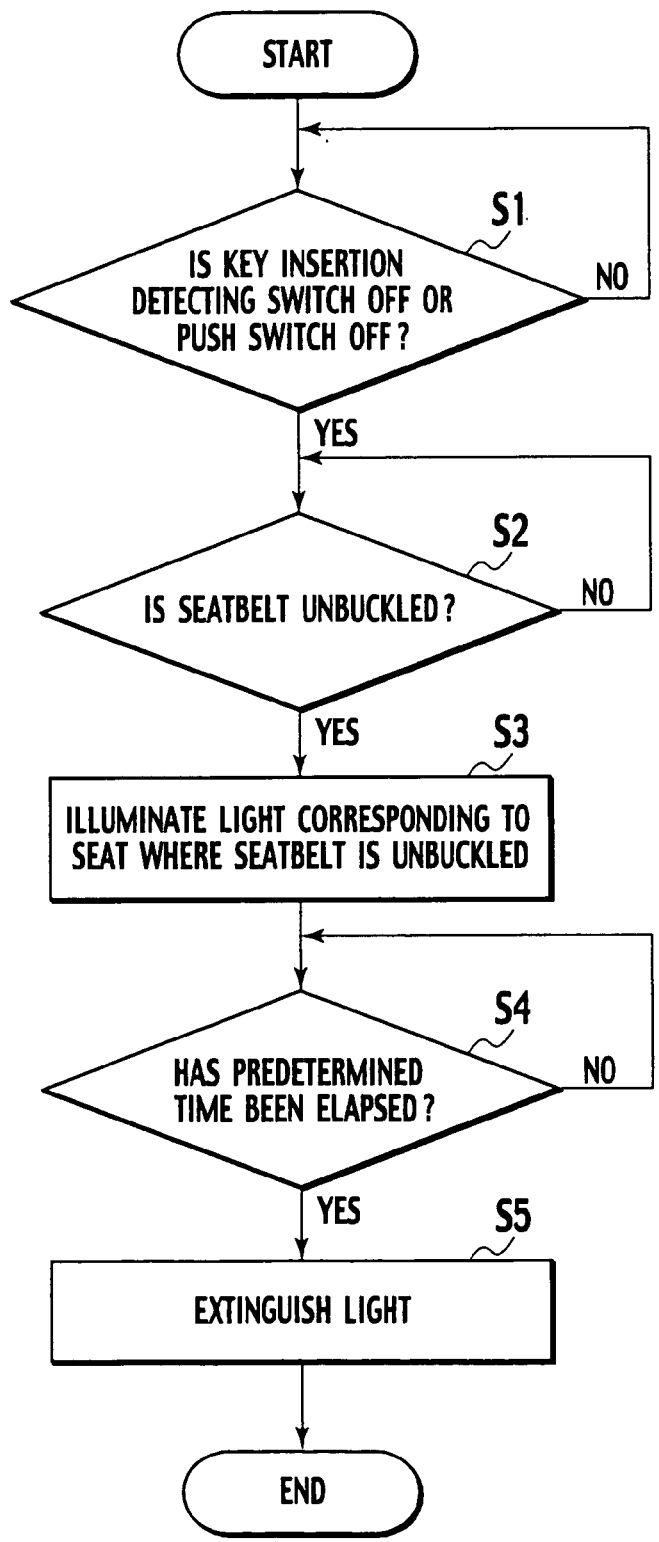
FIG. 5 is a flowchart showing operation of the vehicle room lamp control device shown in FIG. 4.

As shown in FIG. 4, in the second embodiment, buckle switches 3A through 3D are installed at the seats such as the driver's seat, the front passenger's seat, and the rear passengers' seats. A vehicle room lamp control device 25 is equipped with interface circuits 7A through 7D which transmit to a CPU 28 on/off information of the buckle switches 3A through 3D, and driving circuits 9A through 9D for driving room lamps 10A through 10D mounted in order to illuminate the vicinities of the seats to which the buckle switches 3A through 3D correspond respectively. The room lamps 10A through 10D are installed in vicinities of the respective seats.

In this second embodiment, after the engine is stopped (the case of Y at step S1), when, for example, the user of the front passenger's seat releases his/her seatbelt in order to exit the vehicle (the case of Y at step S2) without the driver releasing his/her seatbelt, the buckle switch 3B of the front passenger's seat turns from on to off. Therefore, the room lamp 10B corresponding to the buckle switch 3B is timed-lit (step S3).

However, the timer time of the timed-lighting for the front passenger's seat and the rear passengers' seats (a predetermined period of time) is set to be about 5 seconds to 10 seconds, as opposed to the timer time for the driver's seat of about 30 seconds for example. After the predetermined period of time of the timed-lighting has elapsed (about 30 seconds for the driver's seat, and from about 5 seconds to about 10 seconds for the other seats) (i.e., in the case of Y at step S4), the illumination is extinguished (step S5).

Although the second embodiment describes an example in which room lamps are provided at four places such as the driver's seat, room lamps may be provided only at the two places of the driver's seat and the front passenger's seat.

It is therefore possible to construct a system which is easy to use for the users of the front passenger's seat and the rear passengers' seats, from the standpoint of having improved the convenience at the time of exiting the vehicle.

THIRD EMBODIMENT

A third embodiment of the present invention, in which the present invention is applied to a vehicle equipped with a "push engine start system", will be described with reference to FIGS. 6 to 9.

First, the differences in a "push engine start system", and an "ignition key system" and an "intelligent key system" will be described briefly. An ignition key system is a key system which is even now used in many vehicles. When an ignition key is inserted into a key cylinder and turned from the lock position (LOCK) to the off position, a steering lock mechanism is released. When the ignition key is turned to the accessory position (ACC), power is supplied to the accessory devices. When the ignition key is turned to the ignition on position (IGN), power is supplied to the ignition coil. When the ignition key is turned to the start position (START), power is supplied to the starter motor.

An intelligent key system is a system in which the mechanism formed by a key plate and a key cylinder is omitted from an ignition key system, and instead, an ignition knob and an electronic key unit are provided. By carrying an electronic key (a portable device) which stores a registered ID, communication is carried out between the electronic key and an electronic key controller (a device installed in the vehicle), and the IDs are compared. When the ID of the electronic key matches the ID registered in the electronic key controller, locking and unlocking of the vehicle door (a door locking function) and starting and stopping of the engine (an engine starting function) are possible. No key plate is provided at the electronic key of the intelligent key system.

In the intelligent key system, when the ignition knob is pushed-in, a switch is turned on. The IDs are compared by wireless communication with the electronic key which is being carried. When results of comparison showing matching IDs are obtained, the locking of the rotation of the ignition knob is released, and the ignition knob can be turned from the lock position (LOCK) to the off position, the accessory position (ACC), the ignition on position (IGN), and the start position (START). When the ignition knob is turned from the lock position (LOCK) to the off position, the steering lock mechanism is released. When the ignition knob is turned to the accessory position (ACC), power is supplied to the accessory devices. When the ignition knob is turned to the ignition on position (IGN), power is supplied to the ignition coil. When the ignition knob is turned to the start position (START), power is supplied to the starter motor.

In the same way as an intelligent key system, a push engine start system is a system in which, by carrying an electronic key (a portable device) which stores a registered ID, communication is carried out between the electronic key and an electronic key controller (a device installed in the vehicle), and the IDs are compared. When the ID of the electronic key matches the ID registered in the electronic key controller, locking and unlocking of the vehicle door (a door locking function) and starting and stopping of the engine (an engine starting function) are possible. However, in the push engine start system, the ignition knob of the intelligent key system is not provided, and instead, a push-button-type engine start/stop switch is provided. Further, no key plate is provided at the electronic key of the push engine start system.

In this push engine start system, while the shift position of the automatic transmission is the parking position (P) or the neutral position (N), when the brake pedal is depressed and the engine start/stop switch is pushed and operated, communication between the portable device and the controller installed in the vehicle is carried out such that the IDs are compared. When the IDs match, the steering lock mechanism is released by an actuator, power is supplied to an accessory power source and an ignition power source, and power is supplied to the starter motor and the engine starts. Further, while the engine is running, if the shift position of the automatic transmission is returned to the parking position (P) or the neutral position (N) and the engine start/stop switch is operated, the engine is stopped.

Figure 6:
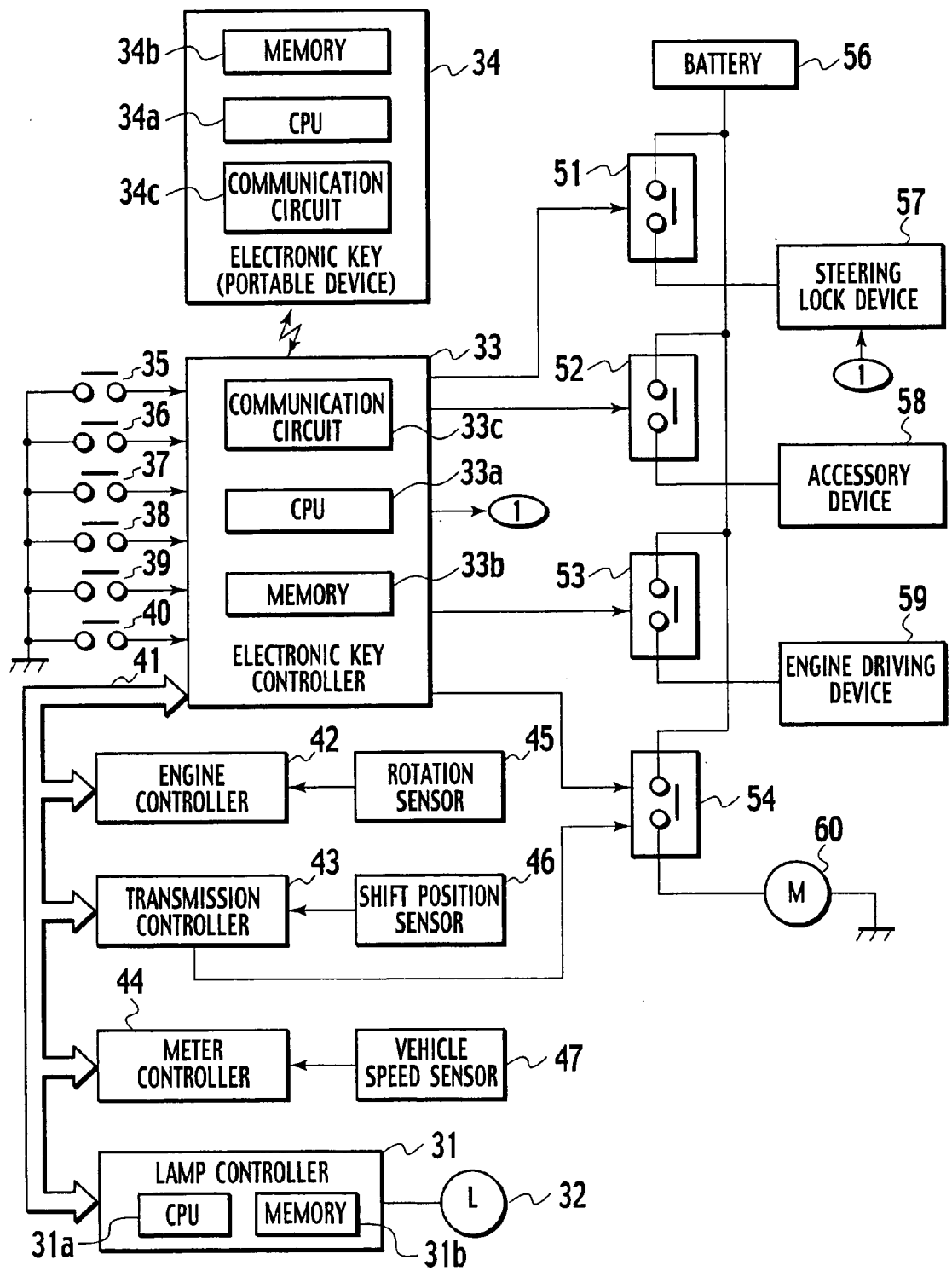
FIG. 6 is a block diagram showing the structure of a vehicle room lamp control device according to a third embodiment of the present invention.

FIG. 6 shows the structure of the third embodiment of the present invention. A lamp controller 31 has peripheral parts such as a CPU 31a, and a memory 31b, and controls the lighting and extinguishing of the vehicle exterior lamps (not shown) such as the headlights, and the vehicle interior lamps such as room lamps 32. In addition to the room lamp provided at the center of the ceiling within the vehicle, the room lamps 32 may include personal lamps provided for each of the vehicle occupants at the left and right front seats and at the left and right rear seats, and foot lamps illuminating the region near the feet of the vehicle occupant when he/she exits the vehicle. There are a manual mode and an automatic mode for the lighting and extinguishing of the room lamps 32. When a room lamp switch (not shown) is operated, the room lamps 32 are lit and extinguished by the manual mode, whereas when an automatic lighting/extinguishing signal is inputted from an electronic key controller 33 which will be described hereinafter, the room lamps 32 are lit and extinguished in the automatic mode.

The electronic key controller 33 (a device installed in the vehicle) has a CPU 33a, a memory 33b, and a communication circuit 33c. The electronic key controller 33 communicates with the electronic key (portable device) 34, and carries out ID comparison, locking and unlocking of the vehicle doors, starting and stopping of the engine, locking and unlocking of the steering, control of the supply of power to the devices installed in the vehicle. The ID which is registered in advance is stored in the memory 33b.

The electronic key (portable device) 34 has a CPU 34a, a memory 34b, a communication circuit 34c, a vehicle door lock switch and unlock switch (not shown), and a trunk opener switch (not shown) The electronic key 34 communicates with the electronic key controller 33 (the device installed in the vehicle), and transmits the ID and switch operation information thereto. The ID unique to that electronic key is stored in the memory 34b. No key plate is provided at the electronic key 34.

An engine start/stop switch 35 is a push-button-type operation member for the vehicle occupant to start and stop the engine (not shown). A brake switch 36 is a detector which detects the depressed state of the brake pedal (not shown), and a buckle switch 37 is a detector which detects the buckled state of the seatbelt (not shown). A door switch 38 is a detector which detects an open state of a vehicle door. A steering lock switch 39 is a detector which detects the locked state of the steering (not shown), and a steering unlock switch 40 is a detector which detects the unlocked state of the steering.

Via a communication line 41 of a network within the vehicle (CAN: Control Area Network), the electronic key controller 33 carries out multiplex communication with the lamp controller 31, an engine controller 42, a transmission controller 43, and a meter controller 44. The rotational speed of the engine is inputted from a rotation sensor 45 via the engine controller 42. The shift position of the automatic transmission (not shown) is inputted from a shift position sensor 46 via the transmission controller 43. The vehicle speed is inputted from a vehicle speed sensor 47 via the meter controller 44.

The electronic key controller 33 opens and closes relays 51 through 54, and controls the supply of the power of a battery 56 to various types of devices installed in the vehicle. A steering lock device 57 is a device which locks or unlocks the steering. The relay 51 is a switch which supplies battery power to the steering lock device 57. While battery power is being supplied to the steering lock device 57 via the relay 51, when a lock signal is supplied from the electronic key controller 33 to the steering lock device 57, the steering lock device 57 locks the steering, and when an unlock signal is supplied, the steering lock device 57 unlocks the steering.

Accessory devices 58 are an audio device and a navigation device. A relay 52 is a switch which supplies battery power to these accessory devices 58. Engine driving devices 59 are a fuel injection device and an ignition device of the engine. A relay 53 is a switch which supplies battery power to these engine driving devices 59.

A relay 54 is a switch which supplies battery power to a starter motor 60. When an engine start signal is outputted from the electronic key controller 33 and a parking position (P) or neutral position (N) shift position signal is outputted from the transmission controller 43, the relay 54 closes, the battery power is supplied to the starter motor 60, and the starter motor 60 rotates.

Figure 7:
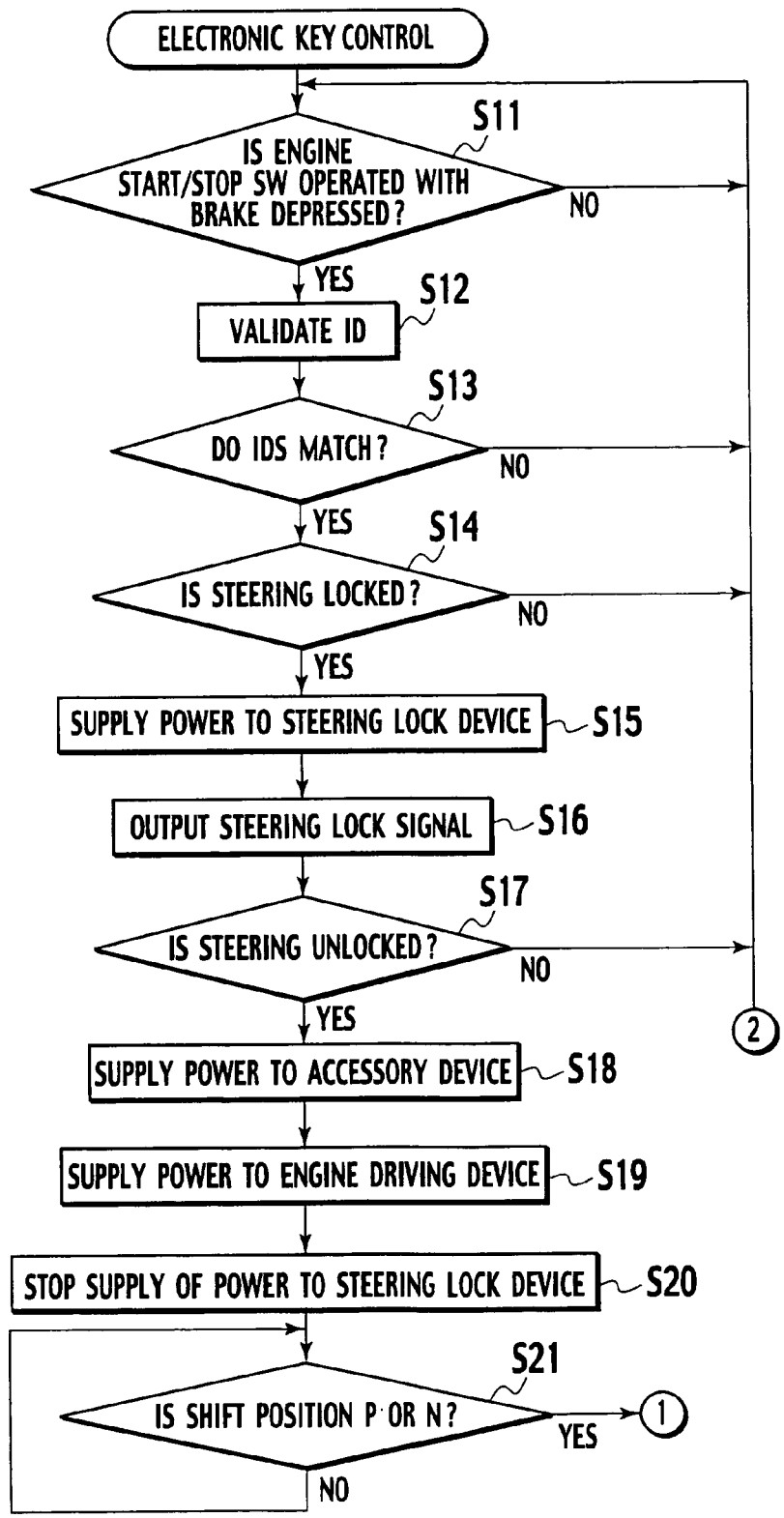
FIG. 7 is a flowchart showing the flow of an electronic key control program according to an embodiment of the present invention.
Figure 8:
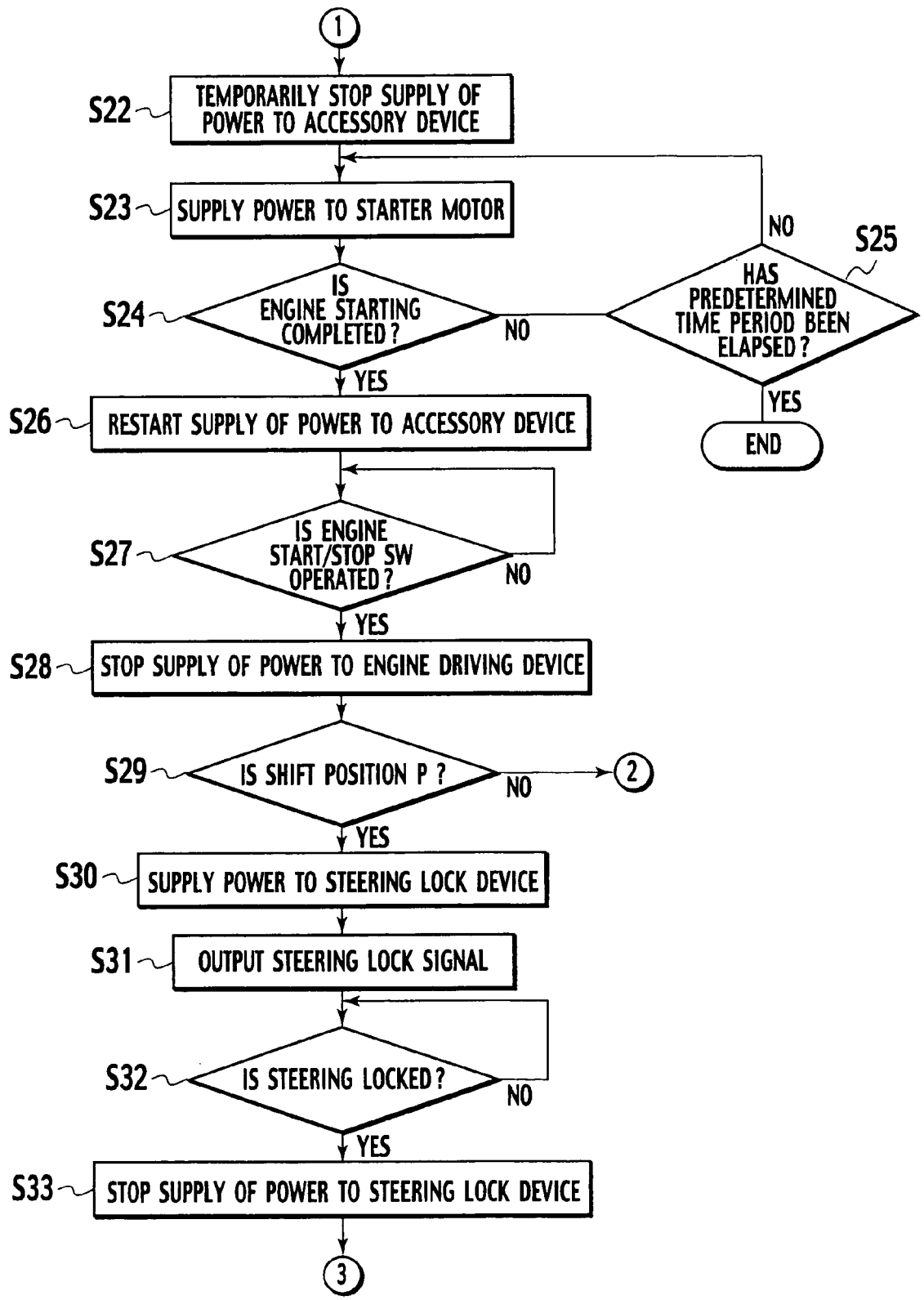
FIG. 8 is a flowchart showing the flow of the electronic key control program continuing from FIG. 7.
Figure 9:
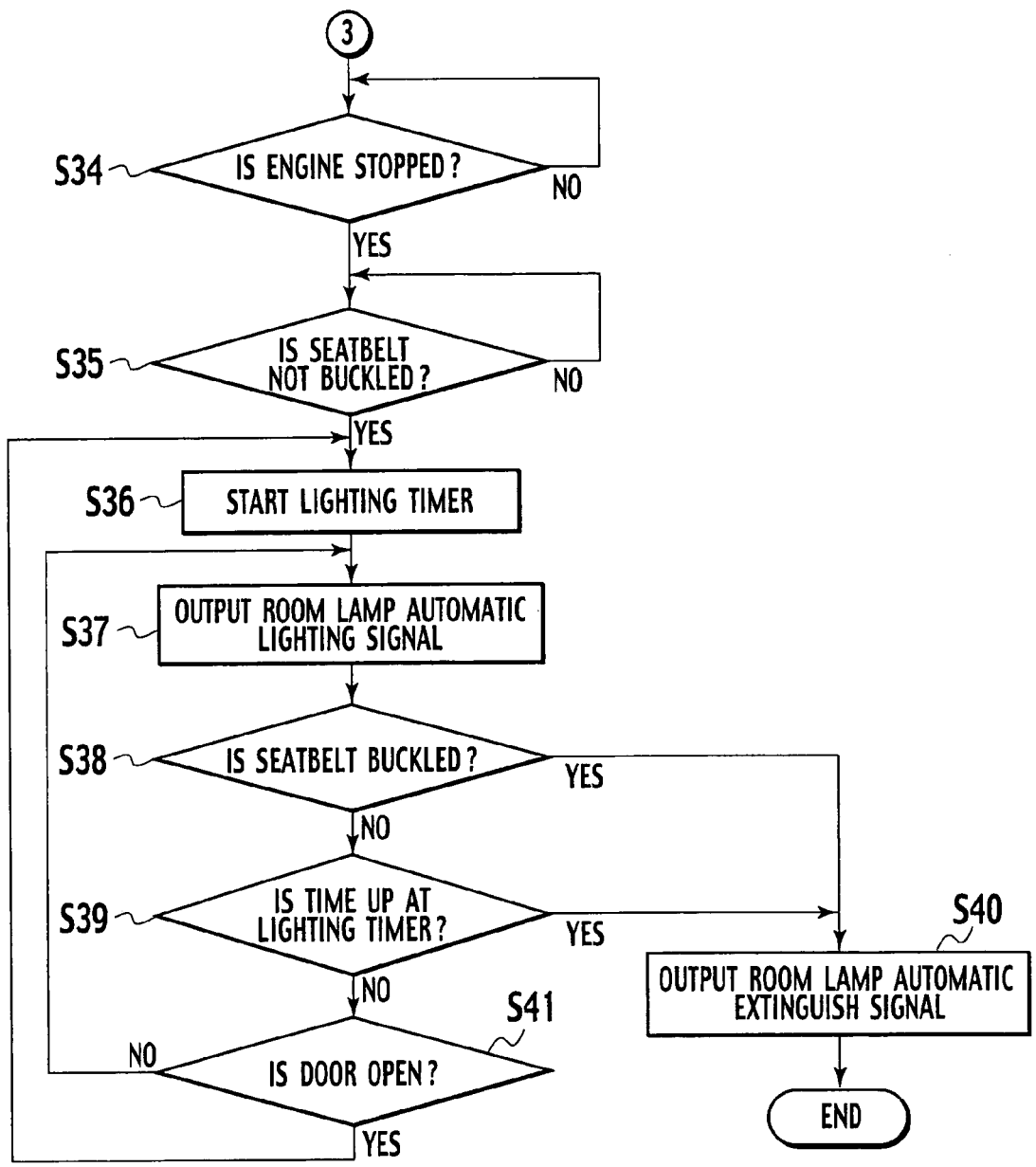
FIG. 9 is a flowchart showing the flow of the electronic key control program continuing from FIG. 8.

FIGS. 7 to 9 are flowcharts showing an electronic key control program. The CPU 33a of the electronic key controller 33 repeatedly executes this electronic key control program.

At step S11, while the brake switch 36 is on, it is confirmed whether the engine start/stop switch 35 has been turned on, i.e., whether the engine start/stop switch 35 has been pushed and operated in a state in which the brake pedal is depressed. If an engine starting operation is carried out in the state in which the brake is depressed, the routine moves on to step S12 where communication with the electronic key 34 is carried out via the communication circuit 33c, and the ID received from the electronic key 34 is compared with the ID stored in the memory 33b. At step S13, it is confirmed whether the ID of the electronic key 34 and the ID of the electronic key controller 33 match. If they match, the routine moves on to step S14, whereas if they do not match, the routine returns to step S11.

If the ID of the electronic key 34 and the ID of the electronic key controller 33 match, at step S14, it is confirmed by the switch 39 that the steering is in a locked state. If the steering is in a locked state, the routine proceeds to step S15, the relay 51 is closed, and battery power is supplied to the steering lock device 57. At step S16, an unlock signal is outputted to the steering lock device 57, and then at step S17, the unlocked state of the steering is confirmed by the switch 40.

If the steering is in an unlocked state, the routine proceeds to step S18 where the relay 52 is closed, battery power is supplied to the accessory device 58, and the accessory device 58 installed in the vehicle, such as an audio device or a navigation device, is set in a usable state. At step S19, the relay 53 is closed, battery power is supplied to the engine driving device 59, and the engine is set in a startable state. Thereafter, at step S20, the relay 51 is closed, and the supply of battery power to the steering lock device 57 is stopped.

At step S21, the shift position of the automatic transmission is inputted from the transmission device 43, and it is confirmed whether the shift position is at the parking position (P) or the neutral position (N). If the shift position is at the parking position (P) or the neutral position (N), in order to start the engine, the routine proceeds to step S22, where, in order to avoid malfunctioning of the accessory device 58 and the effects of noise while the engine is being started-up, the relay 52 is opened, and the supply of battery power to the accessory device 58 is temporarily stopped.

At step S23, in order to start the engine, a close signal (engine start signal) is outputted to a relay 24. Because the shift position is at the parking position (P) or the neutral position (N) at this time, a shift position signal of the parking position (P) or the neutral position (N) is outputted from the transmission controller 43 to the relay 54. The relay 54 closes, and battery power is supplied to the starter motor 60. The starter motor 60 thereby rotates, and the engine is started.

At step S24, the engine rotation speed is inputted from the engine controller 42, and it is confirmed whether the engine is rotating at a rotational speed which is higher than a start completion determination threshold value which is set in advance, i.e., whether the starting of the engine has been completed. If starting of the engine has not been completed, the routine moves on to step S25, where it is confirmed whether a predetermined time period has elapsed since after the starter motor 60 turned and the engine started. If a predetermined time period has already elapsed since the beginning of engine start-up, it is determined that, for some reason, it is difficult to start the engine, and processing is completed. If the predetermined time period has not elapsed, the routine returns to step S23, and starting of the engine by the starter motor 60 is continued.

On the other hand, when starting of the engine is completed, the routine moves on to step S26, the relay 52 is closed, and the supply of battery power to the accessory device 58 is restarted. In the processings up to now, the engine can be started and the vehicle can be driven.

Next, operations at the time of stopping the engine will be described. At step S27, it is confirmed whether the engine start/stop switch 35 has been pushed and operated. If the engine start/stop switch 35 has been pushed and operated, the routine moves on to step S28, the supply of battery power to the engine driving device 59 is stopped, and the engine is stopped. In step S29 after stopping of the engine, the shift position of the automatic transmission is inputted from the transmission controller 43, and it is confirmed whether the shift position is the parking position (P). If the shift position is not the parking position (P), the routine returns to step S11, and the above-described processings are repeated.

When the shift position at the time when the engine stops is the parking position (P), the routine moves on to step S30, the relay 51 is closed, and battery power is supplied to the steering lock device 57. At step 31, a steering lock signal is outputted to the steering lock device 57, and then at step S32, the locked state of the steering is detected by the switch 39. When the steering is in a locked state, the routine proceeds to step S33 where the relay 51 is opened and the supply of battery power to the steering lock device 57 is stopped.

At step S34, the engine rotational speed is inputted from the engine controller 42, and it is determined whether the engine is stopped. When the rotational speed of the engine is lower than a stop determination threshold value set in advance, it is determined that the engine is stopped, and the routine moves on to step S35. At step S35, it is determined by the buckle switch 37 whether the seatbelt is not buckled by the vehicle occupant.

When the engine is stopped and the vehicle occupant has released his/her seatbelt, it is determined that the vehicle occupant intends to exit the vehicle, and processing for lighting the room lamp 32 in the automatic mode is carried out. First, in step S36, the lighting timer is started. This lighting timer is a software timer, and is set to a time period which is sufficient for the vehicle occupant to exit the vehicle, e.g., 30 seconds. Next, at step S37, a room lamp automatic lighting signal is outputted to the lamp controller 31. The lamp controller 31, which has received the room lamp automatic lighting signal, lights the room lamp 32.

At step S38, it is confirmed by the buckle switch 37 whether the seatbelt is buckled by the vehicle occupant. If the vehicle occupant has rebuckled his/her seatbelt, the routine proceeds to step S40 where it is determined that the vehicle occupant no longer wishes to exit the vehicle, and a room lamp automatic extinguish signal is outputted to the lamp controller 31. The lamp controller 31 which receives the room lamp automatic extinguish signal extinguishes the room lamp 32.

On the other hand, if, even after the room lamp is lit, the seatbelt remains unbuckled by the vehicle occupant, the routine proceeds to step S39, and it is confirmed whether time is up at the lighting timer. If time is up at the lighting timer, the routine proceeds to step S40 where it is determined that the vehicle occupant has completed exiting the vehicle, and the room lamp automatic extinguish signal is outputted to the lamp controller 31. The lamp controller 31 which receives the room lamp automatic extinguish signal extinguishes the room lamp 32.

If, after the room lamp is lit, the seatbelt is unbuckled by the vehicle occupant and time is not yet up at the lighting timer, at S41, it is confirmed by the door switch 38 whether the car door is open. When the car door is open, the routine returns to step S36 where it is determined that the vehicle occupant has not finished exiting the vehicle, the lighting timer is restarted, and the above-described processings are repeated. On the other hand, if the vehicle door is closed, the routine returns to step S37, and lighting of the room lamp 32 is continued.

According to a third embodiment of the present invention, in a room lamp control device used in a vehicle equipped with an engine start/stop device (a push engine start system) in which, when the shift position of the transmission is at the parking position or the neutral position, if the push-button-type engine start/stop switch 35 is pushed and operated, the engine is started, and if the engine start/stop switch 35 is pushed and operated while the engine is running, the engine is stopped, the stopped state of the engine is detected and the presence/absence of buckling of the seatbelt by the vehicle occupant is detected, and when, while the engine is running, the engine start/stop switch 35 is pushed and operated and the stopped state of the engine is detected and the state in which the seatbelt is unbuckled by the vehicle occupant is detected, the room lamp 32 is lit. It is thereby possible to avoid lighting of the room lamp even though the vehicle occupant does not intend to exit from the vehicle, and the vehicle occupant does not feel annoyed as with the conventional device.

According to a third embodiment of the present invention, the room lamp 32 is lit when, while the engine is running, the engine start/stop switch 35 is pushed and operated and the stopped state of the engine is detected and the state in which the seatbelt is unbuckled is detected. However, when a predetermined period of time expires after lighting of the room lamp, the room lamp is extinguished. Therefore, by setting the predetermined time period to be a time period which is appropriate for the vehicle occupant to finish exiting the vehicle, it is possible to prevent the room lamp from being continued to be lit needlessly.

According to a third embodiment of the present invention, when, after lighting of the room lamp and before expiration of the predetermined time period, it is detected that the seat belt is buckled, the room lamp is extinguished. Accordingly, it is possible to prevent the room lamp from being continued to be lit even though the vehicle occupant does not intend to exit the vehicle.

According to a third embodiment of the present invention, when, after lighting of the room lamp and before expiration of the predetermined time period, it is detected that the vehicle door is open, the room lamp is extinguished after a predetermined time period from the point in time when it is detected that the vehicle door is open. Accordingly, lighting of the room lamp can be continued reliably until the vehicle occupant has finished exiting the vehicle.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

The entire content of a Patent Application No. TOKUGAN 2003-387582 with a filing date of Nov. 18, 2003, and No. TOKUGAN 2004-91747 with a filing date of Mar. 26, 2004, is hereby incorporated by reference.

What is claimed is:

1. A vehicle room lamp control device comprising:
   means for detecting a buckled state of a seatbelt;
   means for detecting a non-operable state of a vehicle; and
   control means for lighting an illuminating unit that is disposed within a vehicle interior,
   wherein, in the non-operable state of the vehicle, the control means lights the illuminating unit when the seatbelt is released.

2. A vehicle room lamp control device comprising:
   an illuminating unit that is disposed within a vehicle interior;
   a seatbelt-buckling detecting unit that detects a buckled state of a seatbelt;
   a non-operable state detecting unit that detects a non-operable state of a vehicle; and
   a control unit that lights the illuminating unit,
   wherein, in a state in which the non-operable state of the vehicle is detected by the non-operable state detecting unit, the control unit lights the illuminating unit when the seatbelt-buckling detecting unit detects that the seatbelt is released.

3. The vehicle room lamp control device according to claim 2, wherein a plurality of the illuminating units are provided in correspondence with a plurality of seats disposed within the vehicle interior, and the seatbelt and the seatbelt-buckling detecting unit are provided at some of or all of the plurality of the seats, and when the seatbelt-buckling detecting unit detects that any of the seatbelts has been released, the control unit lights the illuminating unit for the seat at which is provided the seatbelt-buckling detecting unit which detected that the seatbelt had been released.

4. The vehicle room lamp control device according to claim 2, wherein the illuminating unit extinguishes after a predetermined time period has elapsed after the seatbelt-buckling detecting unit detects that the seatbelt has been released and the illuminating unit is lit.

5. The vehicle room lamp control device according to claim 2, wherein the non-operable state detecting unit detects states in which a key has been inserted and pulled-out.

6. The vehicle room lamp control device according to claim 2, wherein the non-operable state detecting unit detects a state of a push switch which is operated by operation of an ignition knob.

7. The vehicle room lamp control device according to claim 2, wherein the vehicle is equipped with an engine start/stop device that starts an engine when a push-button-type engine start/stop switch is pushed and operated while a shift position of a transmission is at a parking position or a neutral position, and that stops the engine when the engine start/stop switch is pushed and operated while the engine is running, and further comprises an engine stoppage detecting unit that detects a stopped state of the engine; a seatbelt-buckling detecting unit that detects presence/absence of buckling of a seatbelt by a vehicle occupant; and a lighting/extinguishing control unit that lights a room lamp when, while the engine is running, the engine start/stop switch is pushed and operated and the engine stoppage detecting unit detects the stopped state of the engine and the seatbelt-buckling detecting unit detects a state of non-buckling of the seatbelt by the vehicle occupant.

8. The vehicle room lamp control device according to claim 7, wherein the lighting/extinguishing control unit extinguishes the room lamp after a predetermined time period has elapsed after the room lamp is lit.

9. The vehicle room lamp control device according to claim 8, wherein the lighting/extinguishing control unit extinguishes the room lamp when the seatbelt-buckling detecting unit detects a buckled state of the seatbelt after the room lamp is lit and before the predetermined time period has elapsed.

10. The vehicle room lamp control device according to claim 8, further comprising:
    a door opening detecting unit that detects an open/closed state of a vehicle door, wherein
    when the door opening detecting unit detects an open state of the vehicle door after the room lamp is lit and before the predetermined time period has elapsed, the lighting/extinguishing control unit extinguishes the room lamp after the predetermined time period from a point in time when the open state of the vehicle door is detected.

11. The vehicle room lamp control device according to claim 7, wherein the engine start/stop device stops the engine in a case in which the engine start/stop switch is pushed and operated when a steering is locked by a steering lock device.

12. A vehicle room lamp control method lighting an illuminating unit disposed within the vehicle interior, comprising the operation of:
    detecting a buckled state of a seatbelt;
    detecting a non-operable state of a vehicle; and
    lights the illuminating unit when the seatbelt is released, in the non-operable state of the vehicle.

13. A vehicle room lamp control device for a vehicle equipped with an engine start/stop device that starts an engine when a push-button-type engine start/stop switch is pushed and operated while a shift position of a transmission is at a parking position or a neutral position, and that stops the engine when the engine start/stop switch is pushed and operated while the engine is running, the vehicle room lamp control device comprising:

means for detecting a stopped state of the engine;
means for detecting presence/absence of buckling of a seatbelt by a vehicle occupant; and
means for lighting a room lamp when, while the engine is running, the engine start/stop switch is pushed and operated and the stopped state of the engine is detected and a state of non-buckling of the seatbelt by the vehicle occupant is detected.

14. A vehicle room lamp control device for a vehicle equipped with an engine start/stop device that starts an engine when a push-button-type engine start/stop switch is pushed and operated while a shift position of a transmission is at a parking position or a neutral position, and that stops the engine when the engine start/stop switch is pushed and operated while the engine is running, the vehicle room lamp control device comprising:

an engine stoppage detecting unit that detects a stopped state of the engine;
a seatbelt-buckling detecting unit that detects presence/absence of buckling of a seatbelt by a vehicle occupant; and
a lighting/extinguishing control unit that lights a room lamp when, while the engine is running, the engine start/stop switch is pushed and operated and the engine stoppage detecting unit detects the stopped state of the engine and the seatbelt-buckling detecting unit detects a state of non-buckling of the seatbelt by the vehicle occupant.

15. The vehicle room lamp control device according to claim 14, wherein the lighting/extinguishing control unit extinguishes the room lamp after a predetermined time period has elapsed after the room lamp is lit.

16. The vehicle room lamp control device according to claim 15, wherein the lighting/extinguishing control unit extinguishes the room lamp when the seatbelt-buckling detecting unit detects a buckled state of the seatbelt after the room lamp is lit and before the predetermined time period has elapsed.

17. The vehicle room lamp control device according to claim 15, further comprising:

a door opening detecting unit that detects an open/closed state of a vehicle door, wherein
when the door opening detecting unit detects an open state of the vehicle door after the room lamp is lit and before the predetermined time period has elapsed, the lighting/extinguishing control unit extinguishes the room lamp after the predetermined time period from a point in time when the open state of the vehicle door is detected.

18. The vehicle room lamp control device according to claim 14, wherein the engine start/stop device stops the engine in a case in which the engine start/stop switch is pushed and operated when a steering is locked by a steering lock device.

19. A vehicle room lamp control method of a vehicle equipped with an engine start/stop device that starts an engine when a push-button-type engine start/stop switch is pushed and operated while a shift position of a transmission is at a parking position or a neutral position, and that stops the engine when the engine start/stop switch is pushed and operated while the engine is running, the vehicle room lamp control method comprising the steps of:

detecting a stopped state of the engine and detecting presence/absence of buckling of a seatbelt by a vehicle occupant; and
lighting a room lamp when, while the engine is running, the engine start/stop switch is pushed and operated and the stopped state of the engine is detected and a state of non-buckling of the seatbelt by the vehicle occupant is detected.

* * * * *